United States Patent Office 3,421,474
Patented Jan. 14, 1969

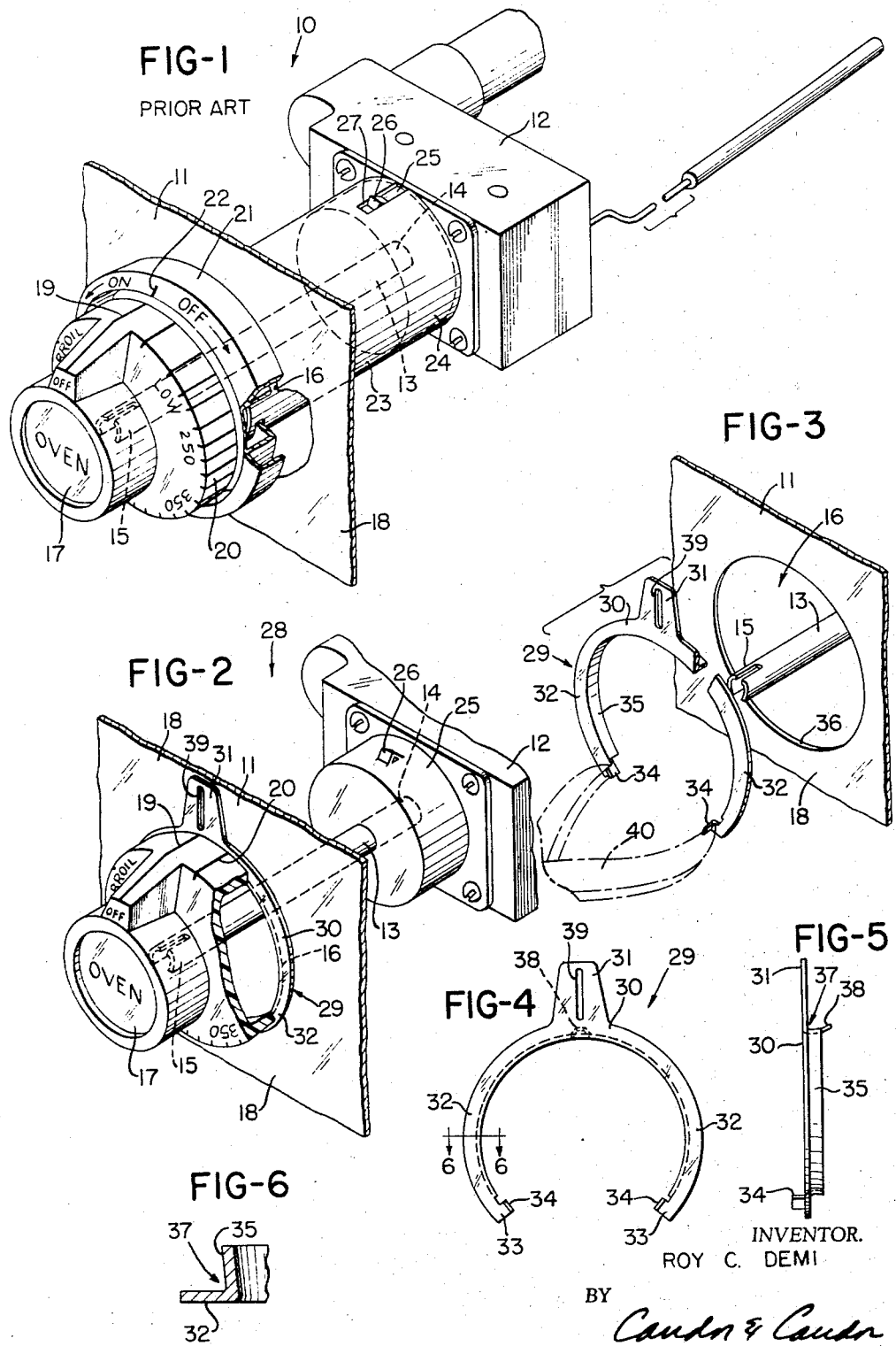

3,421,474
SNAP-IN INDEX POINTER FOR THERMOSTAT VALVES AND THE LIKE
Roy C. Demi, Greensburg, Pa., assignor to Robertshaw Controls Company, Richmond, Va., a corporation of Delaware
Filed Aug. 2, 1965, Ser. No. 476,453
U.S. Cl. 116—133                 12 Claims
Int. Cl. G09f 9/00

ABSTRACT OF THE DISCLOSURE

A crescent-shaped indicator member is provided with a rearwardly directed flange that can resiliently engage the inner peripheral edge of a control panel that surrounds an opening thereof to hold the indicating member to the panel and permit a control device to be disposed on one side of the panel and a control knob on the other side to cooperate with an index. The indicator member is adjustable in the opening of the control panel for initial calibration purposes.

---

This invention relates to an improved means for indicating the position of a control knob or the like for appliance structure or the like.

It is well known that many control units are mounted remote from a control panel of the desirde apparatus so that a control shaft of the control unit can project outwardly through a suitable opening in the control panel to carry a control knob thereon. In the past, the means for indicating the position of the control knob has comprised an arrangement wherein a substantially long cylindrical part is interconnected to the control unit in telescoping relation about the control shaft and carries a ring index means at the other end thereof disposed intermediate the control knob and the front surface of the control panel.

It has been found according to the teachings of this invention that the cost of such prior known control knob indicating means is relatively high and that misalignment of the control shaft with the control panel cannot be compensated for by such prior known indexing means. Further, such prior known indexing means will not readily permit simple adjustment between the control knob and the ring arrangement for accurate indication of the control knob position.

Accordingly, one feature of this invention is to provide an improved combination wherein simplified means are provided for indicating the control knob position for a control unit mounted remote from a control panel or the like, such means of this invention completely eliminating the disadvantages of the prior known indicating means.

Another feature of this invention is to provide an improved control knob position indicator member.

Accordingly, it is an object of this invention to provide an improved means for indicating the position of the control knob or the like, the means of this invention having one or more of the novel features set forth above or hereinafter shown or described.

Another object of this invention is to provide an improved control knob position indicator member.

Other objects, uses and advantages of this invention are apparent from a reading of this description which proceeds with reference to the accompanying drawings forming a part thereof and wherein:

FIGURE 1 is a fragmentary perspective view illustrating the prior art arrangement for indicating the position of the control knob or the like.

FIGURE 2 is a view similar to FIGURE 1 and illustrates the control knob position indicator means of this invention.

FIGURE 3 is a view similar to FIGURE 2 and illustrates the method of inserting the indicator member of this invention in a suitable opening in a control panel or the like.

FIGURE 4 is a front view of the indicator member of this invention.

FIGURE 5 is a side view of the indicator member of FIGURE 4.

FIGURE 6 is an enlarged, fragmentary, cross sectional view taken on line 6—6 of FIGURE 4.

While the various features of this invention are hereinafter described and illustrated as being particularly adaptable for providing control knob position indicator means for a domestic appliance or the like, it is to be understood that the various features of this invention can be utilized singly or in any combination thereof to provide position indicating means for other devices as desired.

Therefore, this invention is not to be limited to only the embodiment illustrated in the drawings, because the drawings are merely utilized to illustrate one of the wide variety of uses of this invention.

Referring now to FIGURE 1, the prior art method and structure for indicating the position of a control knob for a domestic appliance or the like is generally indicated by the reference numeral 10 and comprises a control panel 11, which could merely be one wall of the desired appliance or apparatus, and a control unit 12 secured to the appliance in any suitable manner a desired distance behind the control panel 11.

For example, the control unit 12 can comprise a thermostatic valve arrangement for thermostatically controlling the flow of fuel to a burner means of a domestic oven, top burner means or the like, depending upon the rotational position of a control shaft 13 of the unit 12 relative thereto.

The control shaft 13 is normally C shaped in cross section and has one end 14 interconnected to the control unit 12 and the other end 15 projecting through a circular opening 16 in the control panel 11 to be operatively interconnected to a control knob 17 disposed in front of the front surface 18 of the control panel 11.

The control knob 17 has an off position index mark 19 thereon as well as a plurality of temperature indicating index marks 20 thereon disposed about the outer periphery of the knob 17.

In order to provide a reference point for such indicating marks 19 and 20 on the control knob 17, the prior art structure included a ring arrangement 21 adapted to be disposed between the control knob 17 and the front wall 18 of the control panel 11 and have an outer diameter greater than the outer diameter of the control knob 17 so that an index mark 22 thereon could provide a reference point for the indicating marks 19 and 20 on the control knob 17. In order to maintain the ring arrangement 21 in a set position, the ring 21 had a rearwardly extending cylindrical portion 23 adapted to project through the opening 16 of the control panel 11 and have an end 24 adapted to telescope over a projecting cylindrical part 25 of the control unit 12 to support the ring arrangement 21 on the unit 12.

In order to fix the rotational position of the ring arrangement 21 relative to the control unit 12, the cylindrical projection 25 of the control unit 12 is provided with an outwardly directed tab 26 telescopically receivable in a slot 27 in the end 24 of the cylindrical portion 23 to prevent rotation of the ring arrangement 21 relative to the control unit 12, the control knob 17 having an outer diameter greater than the outer diameter of the cylindrical part 23 to prevent axial movement of the ring arrangement 21 after the same is disposed in assembled relation as illustrated in FIGURE 1.

Therefore, it can be seen that the operator of the system 10 can utilize the reference mark 22 on the ring arrangement 21 to indicate the desired position of the control knob 17 in relation to the indicating marks 19 and 20 thereon so that the control unit 12 can be set at the desired setting thereof.

However, it can also be readily be seen that the further the control unit 12 is mounted away from the control panel 11, the greater the length of the cylindrical part 23 of the ring arrangement 21 and, thus, the greater the cost thereof. Further, it has been found that chances for misalignment between the control shaft 13 and the opening 16 in the control panel 11 increases as the distance between the control unit 12 and the control panel 11 increases whereby the ring arrangement 21 cannot compensate for such misalignment so that a more accurate mounting of the control unit 12 and the control shaft 13 is required in order to effectively utilize the ring arrangement 21.

In addition, should the actual off position of the control shaft 13 be out of alignment with the tab 26 of the control unit 12, it can be seen that when the control knob 17 is turned to its actual off position, there is no means for adjusting the position of the reference mark 22 on the ring 21 arrangement relative to the mark 19 on the control knob 17 so that the indicated position of the control knob 17 relative to the reference point 22 will not reflect the actual setting of the control unit 12. Such misalignment between the control shaft 12 and the tab 26 of the control unit 12 cannot be compensated for in the prior art system 10.

However, according to the teachings of this invention, an improved system is provided and is generally indicated by the reference numeral 28 in FIGURE 2, the system 28 of this invention completely eliminating the disadvantages of the prior art system 10.

In particular, it can be seen that the system 28 of this invention includes the control unit 12 suitably secured to the desired appliance or apparatus at a point remote from the control panel 11 with the control unit 12 having the control shaft 13 projecting through a cylindrical opening 16 in the control panel 11 and carrying the control knob 17 in the manner previously described.

However, the ring arrangement 21 and its interconnected cylindrical member 23 of the prior art of FIGURE 1 have been completely eliminated in the system 28 of this invention and in place thereof a relatively inexpensive indicator member 29 is provided.

As illustrated in FIGURES 2–6, the indicator member 29 of this invention comprises a metal member heat treated to the desired spring temper and can be formed by stamping the same from the desired sheet material.

The indicator member 29 has a substantially wishbone configuration defined by a front wall 30 having a projection 31 interconnected to opposed leg-like portions 32 terminating in ends 33 respectively having outwardly directed tabs 34 for a purpose hereinafter described. The front wall 30 of the indicator member 29 has a rearwardly directed flange means 35 defining an arc greater than one-half of a circle and having an outer diameter slightly larger than the diameter defined by the inner peripheral edge means 36 of the control panel 11 that defines the opening 16 thereof. The flange means 35 of the indicator member 29 can be slightly angularly disposed relative to the plane of the front wall 30 of the indicator member 29 in the manner illustrated in FIGURE 6 to define a recess or groove means 37 for a purpose hereinafter described.

A starter tab 38 is integrally interconnected to and extends rearwardly beyond the flange means 35 at a point substantially medial of the arc defined by the flange 35.

The projection 31 of the front wall 30 of the indicator 29 can have a suitable reference means 39 thereon in any suitable manner. In the embodiment illustrated in the drawings, the reference mark 39 comprises a slot passing completely through the projection 31 of the front wall 30 of the indicator member 29.

When it is desired to utilize the indicator member 29 with the control panel 11, the leg portions 32 can be inwardly flexed toward each other by means of a suitable tool 40, FIGURE 3, to snap the indicator member 29 in the opening 16 of the control panel 11. Alternately, the indicator member 29 can be snapped into the opening 16 by hand by merely inserting the starter tab 38 in the opening 16 to hook the flange 35 partially under the inner peripheral edge means 36 of the panel 11 with the indicator member 29 held at an angle relative thereto so that when the ends 33 of the leg portions 32 are pushed toward the control panel 11, the flange means 35 will cam inwardly to permit the indicator member 29 to be snap fitted in the opening 16.

Regardless of how the indicator member 29 is snap fitted in the opening 16 of the control panel 11, it can be seen that because the diameter defined by the flange means 35 thereof is slightly larger than the diameter of the opening 16 and the control panel 11, the leg portions 32 will be resiliently urged outwardly to place the flange means into frictional engagement with the inner peripheral edge means 36 of the control panel 11 to frictionally hold the inserted indicator member 29 in place on the control panel 11, the flange means 35 being slightly captured by the inner peripheral edge means 36 of the control panel 11 being received in the channel 37 thereof.

However, the frictional engagement between the indicator member 29 and the inner peripheral edge means 36 of the control panel 11 is not sufficient to prevent rotational adjustment of the indicator member 29 relative thereto to properly align the reference point 39 thereof relative to the reference lines 19 and 20 of the control knob 17 so that the reference point 39 will properly indicate the actual position of the control shaft 13 of the control unit 12. Such rotational adjustment of the indicator member 29 can be effected by the tool 40 grasping the tabs 34 to rotate the assembled indicator member 29 relative to the control panel 11.

The front wall 30 of the indicator member 29 can be so constructed and arranged that the same will be completely covered by the control knob 17, if desired, except for the projection 31 thereof or the same can provide a semi-framing decorative structure as illustrated in FIGURE 2.

Therefore, it can be seen that the indicator member 29 of this invention is relatively inexpensive to manufacture in comparison with the ring arrangement 21 and its associated cylindrical portion 23 of the prior are while the indicator member 29 of this invention readily permits adjustment of the same relative to the control panel 11 to properly position the indicating mark 39 relative to the control knob 17 in a manner not provided by the prior art structure.

Further, the indicating means 29 of this invention can permit the control knob 17 to be disposed out of alignment with the opening 16 in the control panel 11 due to misaligned mounting of the control unit 12 relative to the appliance or due to misalignment of the shaft 13 relative to the control unit 12 without adverse results as is provided by the prior art structure of FIGURE 1.

Accordingly, it can be seen that this invention not only provides an improved indicating combination having many advantages over the prior art as well as eliminating the disadvantages thereof, but also this invention provides an improved indicating member for such a combination or the like.

While the form of the invention now preferred has been disclosed as required by the statutes, other forms may be used, all coming within the scope of the claims which follow.

What is claimed is:

1. In combination, an apparatus having a control panel provided with a front wall, said front wall of said control panel having an opening passing therethrough which defines an inner peripheral edge means of said control panel that surrounds said opening, a control unit carried by said apparatus and being spaced behind said control panel, said control unit having an operating control shaft projecting out through said opening, an indicator member disposed in said opening and having index means viewable at said control panel, and a control knob on said control shaft outside said control panel and cooperable with said index means for indicating the operative position of said control shaft, said indicator member having flange means extending rearwardly therefrom and resiliently engaging said edge means in a snap-fit manner to hold said indicator member to said control panel.

2. A combination as set forth in claim 1 wherein said indicator member has a front wall means interconnected to said flange means and extending outwardly from said flange means at an angle thereto, said front wall means being superimposed on said front wall of said control panel and carrying said index means.

3. In combination, an apparatus having a control panel provided with a front wall, said front wall of said control panel having an opening passing therethrough which defines an inner peripheral edge means of said control panel that surrounds said opening, a control unit carried by said apparatus and being spaced behind said control panel, said control unit having an operating control shaft projecting out through said opening, an indicator member disposed in said opening and having index means viewable at said control panel, and a control knob on said control shaft outside said control panel and cooperable with said index means for indicating the operative position of said control shaft, said indicator member being substantially crescent-shaped and having a front wall interconnected to a rearwardly extending flange means whereby said indicator member has opposed leg portions, said indicator member having said flange means snap-fitted into said opening by flexure of said leg portions toward each other whereby said flange means are resiliently urged into engagement with said peripheral edge means of said control panel to hold said indicator means to said control panel and said front wall of said indicator member is superimposed on the front wall of said control panel and carries said index means.

4. A combination as set forth in claim 3 wherein said leg portions of said indicator member respectively have outwardly directed tab means for facilitating flexure of said leg portions toward each other by tool means or the like that can grasp said tab means to move said tab means toward each other.

5. A combination as set forth in claim 3 wherein said indicator member has a starter tab extending rearwardly from said flange means to facilitate initial insertion of said indicator member in said opening of said control panel.

6. A combination as set forth in claim 3 wherein said flange means of said indicator member makes an angle with said front wall thereof to provide channel means receiving said inner peripheral edge means of said control panel.

7. A control knob position indicator member for detachable insertion in an opening of a front wall of a control panel or the like wherein the opening in the front wall defines an inner peripheral edge means of said control panel that surrounds said opening, said indicator member having index means adapted to be viewable at said control panel and cooperable with said control knob for indicating the operative position of a control shaft interconnected to said control knob, said indicator member having flange means extending rearwardly therefrom adapted to resiliently engage the peripheral edge means in a snap-fit manner to hold said indicator member to said control panel.

8. A control knob position indicator member as set forth in claim 7 wherein said indicator member has a front wall means interconnected to said flange means and extending outwardly from said flange means at an angle thereto, said front wall means being adapted to be superimposed on said front wall of said control panel and carrying said index means.

9. A control knob position indicator member for detachable insertion in an opening of a front wall of a control panel or the like, wherein the opening in the front wall defines an inner peripheral edge means of said control panel that surrounds said opening, said indicator member having index means adapted to be viewable at said control panel and cooperable with said control knob for indicating the operative position of a control shaft interconnected to said control knob, said indicator member being substantially crescent-shaped and having a front wall interconnected to a rearwardly extending flange means whereby said indicator member has opposed leg portions, said indicator member being resilient to have said flange means snap-fitted into said opening by flexure of said leg portions toward each other whereby said flange means is adapted to be resiliently urged into engagement with the peripheral edge means of said opening of said control panel to hold said indicator means to said control panel with said front wall of said indicator member being superimposed on the front wall of said control panel and carrying said index means.

10. A control knob position indicator member as set forth in claim 9 wherein said leg portions of said indicator member respectively have outwardly directed tab means for facilitating flexure of said leg portions toward each other by tool means or the like that can grasp said tab means to move said tab means toward each other.

11. A control knob position indicator member as set forth in claim 9 wherein said indicator member has a starter tab extending rearwardly from said flange means to facilitate initial insertion of said indicator member in said opening of said control panel.

12. A control knob position indicator member as set forth in claim 9 wherein said flange means of said indicator member makes an angle with said front wall thereof to provide channel means for receiving the inner peripheral edge means of the opening in said control panel.

References Cited
UNITED STATES PATENTS

| | | | |
|---|---|---|---|
| 2,235,723 | 3/1941 | Myers | 236—94 |
| 2,887,086 | 5/1959 | Boldt et al. | 116—133 X |
| 3,176,541 | 4/1965 | Keeling et al. | 116—133 X |

S. CLEMENT SWISHER, *Primary Examiner.*

J. W. ROSKOS, *Assistant Examiner.*